US009808877B2

(12) United States Patent
Lai et al.

(10) Patent No.: US 9,808,877 B2
(45) Date of Patent: Nov. 7, 2017

(54) ALLOY, OVERLAY, AND METHODS THEREOF

(75) Inventors: George Y. Lai, Del Mar, CA (US); Bingtao Li, Suwanee, GA (US)

(73) Assignee: AZZ WSI LLC, Norcross, GA (US)

( * ) Notice: Subject to any disclaimer, the term of this patent is extended or adjusted under 35 U.S.C. 154(b) by 525 days.

(21) Appl. No.: 12/689,637

(22) Filed: Jan. 19, 2010

(65) Prior Publication Data

US 2011/0120977 A1 May 26, 2011

Related U.S. Application Data

(60) Provisional application No. 61/264,612, filed on Nov. 25, 2009.

(51) Int. Cl.
| | |
|---|---|
| *C22C 38/40* | (2006.01) |
| *C22C 38/44* | (2006.01) |
| *C22C 38/54* | (2006.01) |
| *C22C 38/58* | (2006.01) |
| *B23K 9/04* | (2006.01) |
| *B23K 10/02* | (2006.01) |
| *C22C 38/02* | (2006.01) |
| *B23K 26/32* | (2014.01) |
| *B23K 26/34* | (2014.01) |
| *B23K 35/30* | (2006.01) |
| *C22C 38/18* | (2006.01) |
| *B23K 101/06* | (2006.01) |
| *B23K 101/12* | (2006.01) |
| *B23K 101/34* | (2006.01) |
| *B23K 103/04* | (2006.01) |

(52) U.S. Cl.
CPC ............. *B23K 9/04* (2013.01); *B23K 10/027* (2013.01); *B23K 26/3206* (2013.01); *B23K 26/345* (2013.01); *B23K 35/308* (2013.01); *B23K 35/3086* (2013.01); *C22C 38/02* (2013.01); *C22C 38/18* (2013.01); *C22C 38/40* (2013.01); *C22C 38/44* (2013.01); *C22C 38/54* (2013.01); *C22C 38/58* (2013.01); *B23K 2201/06* (2013.01); *B23K 2201/12* (2013.01); *B23K 2201/34* (2013.01); *B23K 2203/04* (2013.01)

(58) Field of Classification Search
None
See application file for complete search history.

(56) References Cited

U.S. PATENT DOCUMENTS

| | | | |
|---|---|---|---|
| 3,165,400 A * | 1/1965 | Amedee et al. ................ | 420/12 |
| 3,990,892 A | 11/1976 | Machi et al. | |
| 4,015,100 A | 3/1977 | Gnanamuthu et al. | |
| 4,803,045 A | 2/1989 | Ohriner et al. | |
| 2005/0167468 A1* | 8/2005 | Kislovsky et al. ............... | 228/8 |
| 2007/0187369 A1 | 8/2007 | Menon et al. | |
| 2007/0187458 A1* | 8/2007 | Menon et al. ............... | 228/56.3 |
| 2008/0230155 A1* | 9/2008 | Lai ............................... | 148/529 |

FOREIGN PATENT DOCUMENTS

| | | | | |
|---|---|---|---|---|
| DE | 621740 | * | 11/1935 | ............. C22C 38/40 |
| JP | 63103050 A | | 5/1988 | |
| JP | 09257190 A | * | 3/1996 | ............. F16L 58/08 |

OTHER PUBLICATIONS

Gundlach et al., "Heat Treating of High-Alloy Ions", in ASM Handbook, vol. 4, pp. 697-708 (1991).*
United States Non-Final Office Action dated Jun. 17, 2009 issued against U.S. Appl. No. 11/690,763.
United States Final Office Action dated Dec. 2, 2009 issued against U.S. Appl. No. 11/690,763.
European Patent Office; Patent Translate of DE621740; 5 pages; Europe.
European Patent Office; Communication Pursuant to Article 94(3) EPC, issued in connection with European Patent Application No. 10785286.5; dated Feb. 9, 2015; 4 pages; Europe.
Aquilex WSI, Inc.; Amendment in connection with EP10785286,5; May 26, 2015; 2 pages; Europe.
The Patent Office of the People's Republic of China; Translation of Second Notification of Office Action, issued in connection with Chinese Patent Application No. 2015041301134220; dated Apr. 16, 2015; 7 pages; China.
The Patent Office of the People's Republic of China; Translation of Second Notification of Office Action, issued in connection with Chinese Patent Application No. 2015041301134220; dated Apr. 16, 2015; 4 pages; China.
The Patent Office of the People's Republic of China; Third Notification of Office Action, Issued in nnection with CN201080062415.1; dated Dec. 14, 2015; 14 pages; China.
European Patent Office; Summons to attend oral proceedings pursuant to Rule 115(1) EPC, issued in connection with EP10785286.5; Mar. 14, 2016; 2 pages; Europe.
The Patent Office of the People's Republic of China; Fourth Notification of Office Action, issued in connection with CN201080062415.1; dated May 13, 2016; 4 pages; China.
Mexican Patent Office; Official Action, Issued in connection with MX/a/2012/006086; dated Apr. 26, 2016; 5 pages; Mexico.
Canadian Intellectual Property Office; Office Action with Examination Search Report, Issued in Connection with CA2,781,851; dated Oct. 14, 2016; 3 pages; Canada.
Canadian Intellectual Property Office; Office Action with Examination Search Report, Issued in Connection with CA2,781,851; dated Aug. 25, 2017; 3 pages; Canada.

* cited by examiner

Primary Examiner — Johannes P Mondt
(74) Attorney, Agent, or Firm — Greenberg Traurig LLP

(57) ABSTRACT

An alloy comprising about 0.5 weight percent to about 2 weight percent carbon, about 15 weight percent to about 30 weight percent chromium, about 4 weight percent to about 12 weight percent nickel, up to about 3 weight percent manganese, up to about 2.5 weight percent silicon, up to about 1 weight percent zirconium, up to about 3 weight percent molybdenum, up to about 3 weight percent tungsten, up to about 0.5 weight percent boron, up to about 0.5 weight percent impurities, and iron.

8 Claims, No Drawings

ALLOY, OVERLAY, AND METHODS THEREOF

CROSS REFERENCE TO RELATED APPLICATIONS

Applicant claims the benefit, and priority, of U.S. Patent Application No. 61/264,612, filed on Nov. 25, 2009.

BACKGROUND OF THE INVENTION

Field of the Invention

The present disclosure relates generally to an alloy, an overlay, and methods of the same. In more particularity, the present disclosure relates to an iron-chromium-carbon-nickel based hardfacing alloy for use as a weld overlay to protect steel parts against wear, the welded overlay, and methods of the same.

Description of the Related Art

Boiler tubes and pressure vessels, often made of steel, are typically exposed to harsh environments, including but not limited to high-temperature corrosive or erosion-corrosive conditions. In an effort to protect the boiler tubes and pressure vessels, a weld overlay may be applied to at least a portion of the boiler waterwall and pressure vessel.

SUMMARY OF THE INVENTIONS

In accordance with various illustrative embodiments hereinafter described, are alloys having about 0.5 weight percent to about 2 weight percent carbon, about 15 weight percent to about 30 weight percent chromium, about 4 weight percent to about 12 weight percent nickel, up to about 3 weight percent manganese, up to about 2.5 weight percent silicon, up to about 1 weight percent zirconium, up to about 3 weight percent molybdenum, up to about 3 weight percent tungsten, up to about 0.5 weight percent boron, up to about 0.5 weight percent impurities, and iron.

In accordance with another illustrative embodiment, hereinafter is disclosed an overlay having about 0.38 weight percent to about 1.9 weight percent carbon, about 11.25 weight percent to about 28.5 weight percent chromium, about 3 weight percent to about 11.4 weight percent nickel, up to about 2.85% manganese, up to about 2.375% silicon, up to about 0.95% zirconium, up to about 2.85% molybdenum, up to about 2.85% tungsten, up to about 0.498% boron, up to about 1 weight percent impurities, and iron.

In accordance with another illustrative embodiment, hereinafter is disclosed a method of weld applying an alloy to a substrate to form an overlay. The alloy may have about 0.5 weight percent to about 2 weight percent carbon, about 15 weight percent to about 30 weight percent chromium, about 4 weight percent to about 12 weight percent nickel, up to about 3 weight percent manganese, up to about 2.5 weight percent silicon, up to about 1 weight percent zirconium, up to about 3 weight percent molybdenum, up to about 3 weight percent tungsten, up to about 0.5 weight percent boron, up to about 0.5 weight percent impurities, and iron. The substrate may be formed of a material selected from the group consisting of carbon steel, low alloy steel, Cr—Mo steel, and stainless steel.

While the invention will be described in connection with various preferred illustrative embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION

In an illustrative embodiment, an alloy includes from about 0.5 to about 2 percent carbon, from about 15 to about 30 percent chromium, from about 4 to about 12 percent nickel, from about zero to about 3 percent manganese, from about zero to about 2.5 percent silicon, from about zero to about 1 percent zirconium, from about zero to about 3 percent molybdenum, from about zero to about 3 percent tungsten, from about zero to about 0.5 percent boron, from zero to a total of about 0.5 percent impurities, and the balance iron. All percentages disclosed herein are in weight percent, unless otherwise indicated. Further, where a range is disclosed all intermediary ranges are all intended to be described and disclosed thereby, unless otherwise indicated. Accordingly, as a non-limiting example, a disclosure of from about 0.5 to about 2 percent carbon includes a disclosure of from about 0.5 wt. % to about 1.9 wt. % carbon, from about 0.5 wt. % to about 1.8 wt. % carbon, from about 0.6 wt. % to about 2 wt. % carbon, and so forth. Notwithstanding, various alternative and preferred ranges may be disclosed herein for clarity of understanding.

In an alternative embodiment, the alloy includes from about 0.7 to about 1.5 percent carbon, from about 18 to about 25 percent chromium, from about 5 to about 10 percent nickel, from about zero to about 2 percent manganese, from about zero to about 2 percent silicon, from about zero to about 0.5 percent zirconium, from about zero to about 2 percent molybdenum, from about zero to about 2 percent tungsten, from about zero to about 0.5 percent boron, from zero to a total of about 0.5 percent impurities, and the balance iron. In a still further embodiment, the alloy includes from about 0.8 to about 1.3 percent carbon, from about 18 to about 25 percent chromium, from about 5 to about 10 percent nickel, from about zero to about 2 percent manganese, from about zero to about 2 percent silicon, from about zero to about 0.5 percent zirconium, from about zero to about 2 percent molybdenum, from zero to a total of about 0.5 percent impurities, and the balance iron.

In a still further embodiment, any of the alloys described herein may include from about zero to about 2.5 percent silicon, alternatively from about zero to about 2.4 percent silicon, alternatively from about zero to about 2.3 percent silicon, alternatively from about zero to about 2.2 percent silicon, alternatively from about zero to about 2.2 percent silicon, alternatively from about zero to about 2.1 percent silicon, alternatively from about zero to about 1.9 percent silicon, alternatively from about zero to about 1.8 percent silicon, alternatively from about zero to about 1.7 percent silicon, alternatively from about zero to about 1.6 percent silicon, alternatively from about zero to about 1.5 percent silicon, alternatively from about zero to about 1.4 percent silicon, alternatively from about zero to about 1.3 percent silicon, alternatively from about zero to about 1.2 percent silicon, alternatively from about zero to about 1.1 percent silicon, alternatively from about zero to about 1 percent silicon, alternatively from about zero to about 0.9 percent silicon, and so forth. In an alternative embodiment, any of the alloys described herein may include zero manganese, alternatively manganese is present in any of the alloys described herein as an impurity, alternatively, any of the alloys described herein have from about 0.5 to about 2 percent manganese, alternatively from about 1 to about 1.5 percent manganese, alternatively about 1.5 percent manganese, alternatively about 2 percent manganese.

In an embodiment, weld overlays of the alloys described herein include a ratio of chromium to nickel ranging from about 2 to about 4.5, alternatively from about 2.5 to about 4.5, alternatively from about 3 to about 4.5, alternatively from about 3 to about 4, alternatively from about 2 to about 3. Without wishing to be bound by the theory, Applicant believes that iron-chromium-carbon alloys containing a critical amount nickel have surprisingly good ductility and toughness such that—when applied as a weld overlay in a boiler or processing vessel—the weld overlay is not susceptible to the development of stress cracks. Thus, in an embodiment, after complete application of the weld overlay, the weld overlay is substantially free from stress cracks. Further, without wishing to be bound by the theory, Applicant believes that adequate amounts of carbon in the alloy may form adequate eutectic chromium carbide hard phases which may provide erosion protection, and adequate amounts of chromium in the alloy may form a protective chromium oxide scale, which may resist high-temperature corrosion and erosion-corrosion.

The alloy may be applied to any suitable substrate, including without limitation substrates formed from carbon steel, low alloy steel, Cr—Mo steel, or stainless steel, to form an overlay. In an embodiment, the alloy is applied to at least a portion of a substrate which may be a pressure boundary, such as a furnace wall (also referred to as a waterwall), generally made of a series of connected tubes, in a boiler or other pressure vessel to form an overlay. The method of application of the alloy to the substrate to form the overlay may be that of any suitable metallurgical joining process, including without limitation brazing, Laser cladding, and preferably any suitable welding method including without limitation gas-metal-arc welding, gas-tungsten-arc welding, submerged arc welding, electroslag welding, plasma transfer arc welding, and Laser welding.

Without wishing to be bound by the theory, Applicant believes that after the alloy is applied to the substrate, the resulting overlay has sufficient ductility and hardness such that the overlay is generally not susceptible to stress cracking: even when the size of the weld overlay being applied at an area varies from a few square feet to thousands of square feet, alternatively from about 50 square feet to about 5000 square feet or larger, alternatively from about 100 square feet to about 1000 square feet, alternatively from about 200 square feet to about 900 square feet, alternatively from about 200 square feet to about 600 square feet. Preferably, the overlay has an elongation ranging from about 4% to about 20%, alternatively from about 6% to about 15%. For the purposes of this disclosure, including the below examples, elongation is understood as measured by room-temperature tensile testing, per ASTM E8/E8M-08. Preferably, the overlay has a hardness, prior to heat treatment, ranging from about Rockwell "C" values RC 25 or higher, alternatively from about Rockwell "C" values RC 30 or higher, alternatively from about RC 30 to about RC 45. In another embodiment, the overlay may have a hardness, after post weld heat treatment, ranging from about RC 30 to about RC 50, or higher. For the purposes of this disclosure, including the below examples, hardness is understood as measured per ASTM E384-08a, using a Vickers hardness tester under a 500 gram load measured on the cross-section of the weld overlay. The Vickers hardness values were then converted to Rockwell C values per ASTM E140-07.

When the alloy is applied to a substrate by welding, typically both the alloy and substrate melt, and after solidification, the resulting weld overlay has a composition equal to the composition of the alloy diluted by at least a portion of the amount of substrate that was melted. In an embodiment, the composition, on an elemental basis, in weight percent, of the weld overlay may be equal to that of the composition, on an elemental basis, of the alloy diluted by an amount ranging from about 5 to about 25 percent, alternatively about 10 percent, depending on various factors including the elemental composition of the substrate, the welding process and the welding parameters. Accordingly, the above-described composition of the weld overlay, on an elemental basis, with the exception of iron and impurities, may each individually be reduced from those of the pre-welded alloy by about 5 to about 25 percent, alternatively about 10 percent, upon application of the alloy to the substrate. The weld overlay may have a higher weight percent iron and impurities than the alloy. In an embodiment, the weld overlay has up to about 1.5 weight percent impurities, alternatively up to 1 weight percent impurities, alternatively up to 0.5 weight percent impurities. By way of a non-limiting example, after the application of the alloy to the substrate, the percentage of chromium in the weld overlay may be about 10 percent less than the percentage of chromium in the alloy, and the percentage of nickel in the weld overlay may be equal to, higher, or lower than 10 percent less than the percentage of nickel in the alloy.

In an embodiment, the overlay may be heat-treated in a furnace at a furnace temperature above about 1200° F., alternatively at about 1400° F. or higher, for up to about an hour or longer depending on the size of the component. Without wishing to be bound by the theory, Applicant believes that heat treatment of the overlay can increase the overlay's hardness.

The weld overlays presented in Table 1 were prepared as described in the below examples. In the examples, elongation and hardness were measured as described above, chemical analysis of the carbon content of the weld overlays were conducted per ASTM E 1019-03, and chemical analysis of all other elements of the weld overlays were conducted per ASTM E572-02a(2006).

TABLE 1

Room-Temperature Tensile Properties of Weld Overlays

| Weld Overlay Sample | YS ksi (MPa)* | UTS ksi (MPA)** | % Elongation |
|---|---|---|---|
| Filler Metal "A" | 101.9 (703) | 129.7 (894) | 3.0 |
|  | 91.7 (632) | 113.4 (782) | 3.0 |
| Filler Metal "B" | 86.2 (594) | 130.0 (897) | 17.0 |
|  | 79.7 (550) | 128.1 (883) | 18.0 |
| Filler Metal "C" | 96.2 (663) | 128.5 (886) | 5.0 |
|  | 92.8 (640) | 137.1 (946) | 10.0 |

*YS ksi means yield strength as measured in kilo-pounds-force per square inch (the values are also given in megapascals, MPa).
**UTS ksi means ultimate tensile strength as measured in kilo-pounds-force per square inch (the values are also given in megapascals, MPa).

EXAMPLE 1

A Filler Metal "A" included 1.1 wt. % carbon, 21 wt. % chromium, 2.8 wt. % nickel, 0.6 wt. % molybdenum, 1.0 wt. % manganese, 1.0 wt. % silicon and the balance iron plus impurities, was weld overlaid on a three-quarter inch thick carbon steel plate over an area of about 3 inches wide by 15 inches long. Gas-metal arc-welding was used to prepare a weld overlay sample in a horizontal progression mode with the following welding parameters: 26 Volts, 190-200

Amperage, 23 inches per minute ("ipm") of traveling speed, 235 ipm of wire feed speed using an 98% argon and 2% oxygen shielding gas. The chemical analysis of the weld overlay resulted in 18.4 wt. % chromium, 1.02 wt. % carbon, 2.5 wt. % nickel along with other minor elements. The weld overlay exhibited hardness of Rockwell "C" values ranging from RC 34 to RC 38. Duplicate flat tensile specimens of the weld overlay were prepared by machining off both the substrate steel and the uneven overlay surface. Both specimens were tensile tested and both tests resulted in a 3% elongation.

EXAMPLE 2

A Filler Metal "B" including 0.93% carbon, 19.8% chromium, 6.7% nickel, 0.7% molybdenum, 1.9% manganese, 1.4% silicon, and balance iron plus impurities, was weld overlaid on a carbon steel plate having the same dimensions as in Example 1. Gas-metal-arc welding was used to prepare the weld overlay sample in a horizontal progression mode with the following welding parameters: 25 Volts, 195-205 Amperage, 28 ipm of travel speed, 310 ipm of wire feed speed, and a shielding gas consisting of 98% argon and 2% oxygen. Chemical analysis of the weld overlay resulted in 0.84 wt. % carbon, 17.5 wt. % chromium, 6.6 wt. % nickel, 1.3 wt. % manganese, 0.6 wt. % molybdenum, 1.2 wt. % silicon and balance iron along with impurities. The weld overlay exhibited hardness of Rockwell "C" values ranging from RC 29 to RC 34. Duplicate flat tensile specimens were prepared by machining off both the substrate steel and the uneven overlay surface. A first tensile test resulted in a 17% elongation and a second tensile test resulted in an 18% elongation.

EXAMPLE 3

A Filler Metal "C" including 1.08 wt. % carbon, 24.77 wt. % chromium, 6.74 wt. % nickel, 0.56 wt. % molybdenum, 1.99 wt. % manganese, 1.5 wt. % silicon, and balance iron plus impurities was overlaid on a carbon steel plate having the same dimensions as in Example 1. Gas-metal-arc welding was used to prepare the weld overlay sample in a horizontal progression mode with the following welding parameters: 25 Volts, 195-205 Amperage, 28 ipm of travel speed, 310 ipm of wire feed speed, and a shielding gas consisting of 98% argon and 2% oxygen. Chemical analysis of the weld overlay resulted in 1.06 wt. % carbon, 22.9 wt. % chromium, 6.1 wt. % nickel, 0.52 wt. % molybdenum, 2.15 wt. % manganese, and 1.39 wt. % silicon plus impurities. The hardness of the weld overlay was found to be in Rockwell "C" values ranging from RC 30 to RC 32. Duplicate flat tensile specimens of the weld overlay were prepared by machining off both the substrate steel and the uneven overlay surface. A first tensile test resulted in a 5% elongation and a second tensile test resulted in a 10% elongation.

The invention claimed is:

1. A hardfacing welding alloy that can be applied by welding to form an overlay over an upper surface of a steel substrate for protection against cracking, high-temperature corrosion and erosive wear, the hardfacing welding alloy comprising about 0.5 weight percent to about 2 weight percent carbon, about 15 weight percent to about 30 weight percent chromium, about 4 weight percent to about 12 weight percent nickel, about 0.5 to about 2.0 weight percent manganese, up to about 2.5 weight percent silicon, up to about 1 weight percent zirconium, up to about 3 weight percent molybdenum, up to about 3 weight percent tungsten, up to about 0.5 weight percent boron, and balance being iron along with about 0.5 weight percent impurities, and wherein the ratio of chromium to nickel is in a range of about 2 to about 3.

2. An overlay formed on a substrate component by welding of the hardfacing welding alloy according to claim 1, wherein the overlay has a hardness ranging from Rockwell "C" value of RC 25 or higher.

3. An overlay formed on a substrate component by welding of the hardfacing welding alloy according to claim 1, wherein the overlay has a hardness ranging from Rockwell "C" value of RC 30 or higher.

4. A method of weld overlaying a substrate comprising: applying the welding alloy of claim 1 to the substrate to form an overlay, wherein the substrate is formed of a material selected from the group consisting of carbon steel, low alloy steel, Cr-Mo steel, and stainless steel.

5. The method of claim 4, further comprising heat-treating the overlay at temperatures above about 649° C. (1200° F.).

6. The method of claim 4, wherein the substrate is at least a portion of a waterwall in a boiler.

7. The method of claim 4, wherein the substrate is at least a portion of a processing vessel or processing equipment.

8. The method of claim 4, wherein the welding alloy is applied to the substrate by a welding method selected from the group consisting of gas-metal-arc welding, gas-tungsten-arc welding, submerged arc welding, electroslag welding, plasma transfer arc welding, and laser welding.

* * * * *